(12) United States Patent
Porte

(10) Patent No.: US 8,308,110 B2
(45) Date of Patent: Nov. 13, 2012

(54) SYSTEM FOR DEFROSTING THE LEADING EDGE SHEATH OF AN AIR INLET HOOD FOR A TURBOENGINE

(75) Inventor: Alain Porte, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 1122 days.

(21) Appl. No.: 11/993,009

(22) PCT Filed: Jun. 15, 2006

(86) PCT No.: PCT/FR2006/001350
§ 371 (c)(1),
(2), (4) Date: Dec. 18, 2007

(87) PCT Pub. No.: WO2006/136680
PCT Pub. Date: Dec. 28, 2006

(65) Prior Publication Data
US 2010/0200699 A1    Aug. 12, 2010

(30) Foreign Application Priority Data
Jun. 21, 2005   (FR) ...................................... 05 06264

(51) Int. Cl.
*B64D 15/02* (2006.01)
(52) U.S. Cl. .................................................. 244/134 B
(58) Field of Classification Search ................ 244/53 B, 244/134 B, 207, 208
See application file for complete search history.

(56) References Cited

U.S. PATENT DOCUMENTS

| 4,603,824 | A | | 8/1986 | McArdel | |
|---|---|---|---|---|---|
| 4,757,963 | A | * | 7/1988 | Cole ........................... | 244/134 B |
| 5,400,984 | A | * | 3/1995 | Arnold et al. .............. | 244/134 B |
| 5,485,975 | A | * | 1/1996 | Tindell ......................... | 244/53 B |
| 6,585,191 | B2 | * | 7/2003 | Andre et al. ............... | 244/134 B |

FOREIGN PATENT DOCUMENTS

| EP | 1 251 257 | 10/2002 |
|---|---|---|
| EP | 1 318 283 | 6/2003 |
| GB | 850 691 | 10/1960 |
| JP | 08-045520 | 2/1996 |

OTHER PUBLICATIONS

International Search Report dated Oct. 27, 2006.

* cited by examiner

*Primary Examiner* — Tien Dinh
*Assistant Examiner* — Valentina Xavier
(74) *Attorney, Agent, or Firm* — Dickinson Wright PLLC

(57) ABSTRACT

The system for defrosting the leading edge sheath of an air intake hood for a turboengine comprises a hot pressure air supply duct (60) and a protective shell (90) which are longitudinally rigid and rigidly fixed to the partition (5) of a caisson (10), wherein said protective shell (90) is slidable with respect to a sliding bearing (15) embodied in the partition (11) and said air supply duct (60) is connected to the protective shell (90) by an elastic wall (16) closing an insulating space (12) and enabling relative longitudinal movements to be carried out between the air supply duct (60) and the protective shell (90).

11 Claims, 4 Drawing Sheets

SYSTEM FOR DEFROSTING THE LEADING EDGE SHEATH OF AN AIR INLET HOOD FOR A TURBOENGINE

FIELD OF THE INVENTION

The present invention relates to the deicing of nose inlet cowls of turbine engines, in particular for aircraft.

BACKGROUND OF THE INVENTION

It is known that, if required (to prevent the formation of ice or remove ice already formed), the leading edge of the nose inlet cowl of such turbine engines is deiced by heating with pressurized hot air taken from said turbine engine and conducted to said leading edge by a circuit for circulating hot air. This pressurized hot air taken from the engine is at a high temperature, for example around 500° C., such that said duct radiates heat and the surrounding structures of said nose inlet cowl that are sensitive to heat (for example the soundproofing panels made of composite material) must be protected from the heat. Furthermore, for obvious safety reasons, it is also necessary to provide protection for said surrounding structures in the event of pressurized hot air leaks or in the event of said duct being ruptured.

Accordingly, document EP-1 251 257 discloses a nose inlet cowl for a turbine engine, in particular for an aircraft, said nose inlet cowl being provided with means for deicing its leading edge and comprising to this end:
- a hollow leading edge defining an annular chamber closed by a first internal bulkhead;
- a pressurized hot air supply duct designed to be connected, at its rear end opposed to said leading edge, to a pressurized hot air circuit and, at its front end toward said leading edge, to an injector injecting said pressurized hot air into said annular chamber, said supply duct being at least partly arranged in a compartment defined, at the front, by said first internal bulkhead and, at the rear, by a second internal bulkhead; and
- an internal protective envelope arranged in said compartment and defining an isolation volume enclosing said supply duct.

Thus, in this known nose inlet cowl, said duct is isolated from the remaining interior space of the nose inlet cowl, and said internal protective envelope, which is continuous and integral, enables the surrounding structures to be protected from thermal radiation and pressurized hot air leaks and also from the effects of a rupturing of said duct. The provision of air inlet and outlet openings makes it possible, during normal operation, to achieve permanent internal ventilation of the isolation volume, thereby limiting the thermal radiation of the supply duct, the heat-sensitive surrounding structures thus being protected from any damage or aging associated with the exposure to high temperatures. In the event of the duct leaking, rupturing or exploding, the hot air is discharged to the outside through the outlet opening such that, once again, said surrounding structures are protected from the pressurized hot air.

This known nose inlet cowl thus perfectly performs its functions of thermally protecting said surrounding structures. However, in practice, to prevent the longitudinal expansion of said supply duct and of said protective envelope (which are generally made of steel) under the effect of the temperature from imposing stresses on said first and second bulkheads, it is required to produce each of the two elements formed by said supply duct and said protective envelope in two parts which are nested one inside the other and able to slide relative to one another in a sealed manner.

Thus, the increase due to heat in the length of said duct and of said envelope is absorbed by the retractable sliding movement of said two parts forming these elements.

However, it should be noted that the hot air circulating in said supply duct is under a high pressure, for example around 10 to 20 bar, with the result that this internal pressure has the effect of separating the two parts of said supply duct from one another during normal operation and of separating the two parts of said supply duct and the two parts of the protective envelope from one another in the event of said supply duct rupturing. This consequently results in stresses being applied to said bulkheads by the two parts of said supply duct and/or of said protective envelope, said stresses tending to deform said bulkheads by making them bulge toward the outside of the compartment. It thus becomes necessary to provide heavy and costly reinforcements designed to counter such bulging.

SUMMARY Of The INVENTION

The subject of the present invention is a deicing system that makes it possible to avoid the deformations of the bulkheads without thereby using reinforcements for said bulkheads.

To this end, according to the invention, the system for deicing the leading edge of a nose inlet cowl for a turbine engine, in particular for an aircraft, said leading edge being hollow and defining an annular chamber closed by a first internal bulkhead, and said deicing system comprising:
- a pressurized hot air supply duct designed to be connected, at its rear end opposed to said leading edge, to a pressurized hot air circuit and, at its front end toward said leading edge, to an injector injecting said pressurized hot air into said annular chamber of the leading edge, said supply duct passing through a compartment of said nose inlet cowl that is defined, at the front, by said first internal bulkhead and, at the rear, by a second internal bulkhead; and
- an internal protective envelope arranged in said compartment and defining an isolation volume enclosing said supply duct, is noteworthy in that:
- said supply duct and said protective envelope are longitudinally rigid;
- on one side, said supply duct and said protective envelope are rigidly fastened to one of said bulkheads; and
- on the other side:
  - said protective envelope is able to slide relative to a sliding bearing provided in the other bulkhead; and
  - said supply duct is connected to said protective envelope by an elastic wall which closes off said isolation volume and allows relative longitudinal movements between said supply duct and said protective envelope.

Thus, not only does said supply duct by itself withstand the hot air pressure, but in addition said protective envelope can slide with respect to one of said bulkheads and said supply duct can slide with respect to said protective envelope. The result of this, therefore, is that no deformation force can be applied to said bulkheads by the supply duct and/or the protective envelope.

Said sliding bearing may be arranged either in said first internal bulkhead or in said second internal bulkhead.

In one particularly simple embodiment, said elastic wall is formed by a spring washer arranged in an at least approximately orthogonal manner with respect to said supply duct and to said protective envelope. To increase its longitudinal elasticity, said washer may have concentric corrugations. Advantageously, said spring washer consists of a spring steel or the like and it is welded to said supply duct and to said protective envelope (both consisting in a known manner of steel sheet) along its internal and external peripheries, respectively.

The spring washer may be arranged at the location of a narrowing of the supply duct, thus making it possible for its width to be increased. In this case, it is advantageous to provide a conical guide surface for the hot air, upstream of said spring washer, so as to cause said pressurized hot air to converge toward said narrowing of said supply duct.

The rear end of the protective envelope may be connected to the hot air circuit by co-acting flanges and, in that case, said spring washer and said narrowing are advantageously situated level with the flange integrally connected to the rear end of said protective envelope. Moreover, said conical guide surface may be borne by the flange integrally connected to said hot air circuit.

Furthermore, it is advantageous for assembly and maintenance reasons that said sliding bearing allows said protective envelope to perform a limited nutation movement.

BRIEF DESCRIPTION OF THE DRAWINGS

The figures of the appended drawing will give a clear understanding of how the invention can be implemented. In these figures, identical references denote like elements.

DETAILED DESCRIPTION OF THE INVENTION

Figure 1:
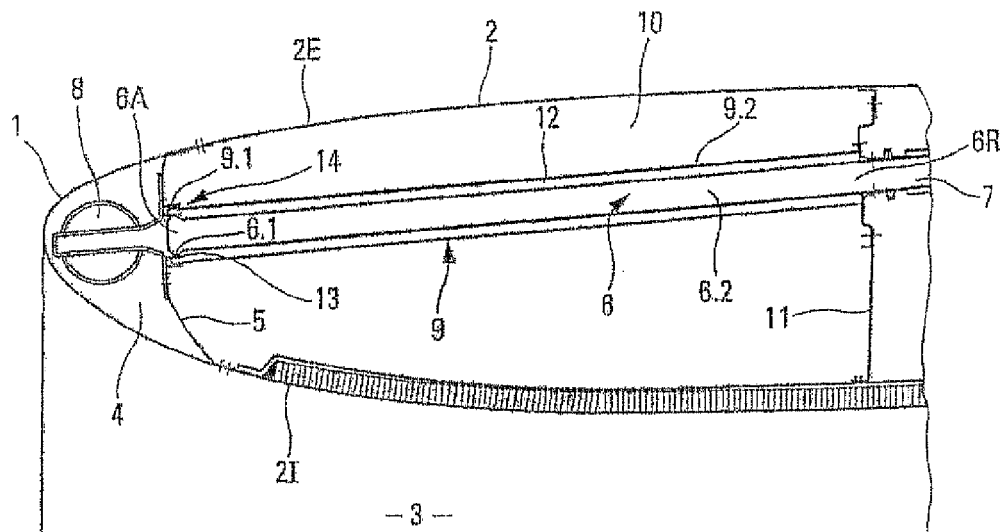
FIG. 1 shows, in axial section, the leading edge of a known nose inlet cowl.

The leading edge 1 of the cowl 2 surrounding the air inlet 3 of an aircraft turbine engine (not otherwise represented) is provided with known deicing means which comprise:
  an internal peripheral chamber 4 formed in the hollow leading edge 1 and closed by an internal front bulkhead 5 of annular shape which is anchored to the upper surface side 2E and to the lower surface side 2I of the cowl 2;
  a pressurized hot air supply duct 6 designed to be connected, at its rear end 6R opposed to said leading edge 1, to a circuit 7 of pressurized hot air originating from the hot-stream generator of the turbine engine (not shown) and, at its front end 6A, to an injector 8 injecting said pressurized hot air into said internal chamber 4 of the leading edge 1; and
  a tubular protective envelope 9 surrounding said supply duct 6.

The supply duct 6 and the protective envelope 9 pass through a compartment 10 defined, at the front, by said internal front bulkhead 5 and, at the rear, by an internal rear bulkhead 11 of annular shape which is anchored to the upper surface side 2E and to the lower surface side 2I and through which said rear end 6R of the duct 6 passes. Thus, said protective envelope 9 defines, in collaboration with the front 5 and rear 11 bulkheads, an isolation volume 12.

Figure 2:
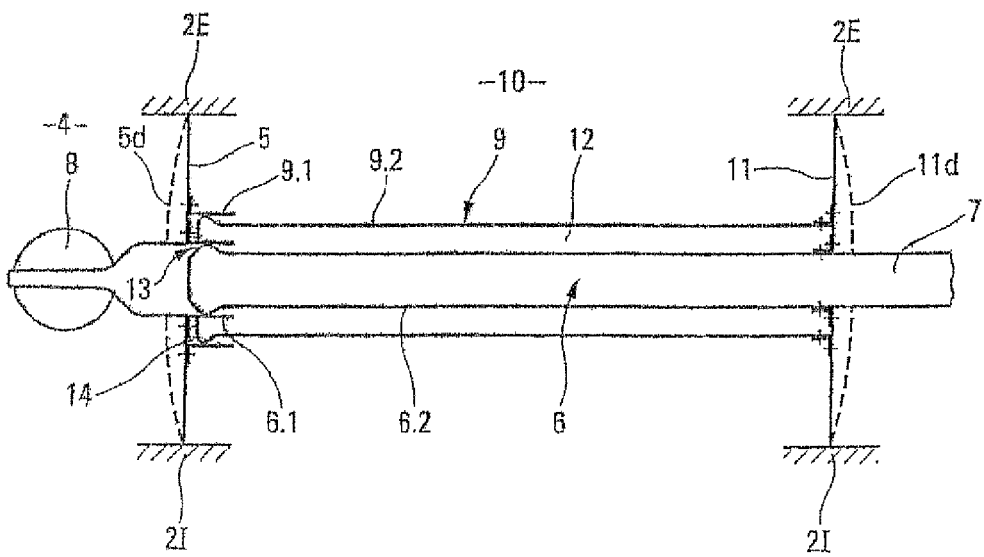
FIG. 2 schematically illustrates the known leading edge shown in FIG. 1 and depicts the disadvantage thereof which the present invention overcomes.

In this known embodiment shown in FIGS. 1 and 2, both the supply duct 6 and the protective envelope 9 are in fact formed by two parts, respectively 6.1, 6.2 and 9.1, 9.2. The two parts 6.1, 6.2 of said supply duct 6 are mounted telescopically relative to one another and are connected in a sealed manner by a sliding seal or a bellows 13. Likewise, the two parts 9.1 and 9.2 of the protective envelope 9 are mounted telescopically and are connected in a sealed manner by a sliding seal or a bellows 14.

Moreover, the parts 6.1 and 9.1 are rigidly fastened to the front bulkhead 5, whereas the parts 6.2 and 9.2 are rigidly fastened to the rear bulkhead 11.

It will readily be appreciated that the production of the supply duct 6 and of the protective envelope 9 in the form of two telescopic parts 6.1, 6.2 and 9.1, 9.2 makes it possible to eliminate the pressure exerted on said bulkheads 5 and 11 by the thermal expansion of the supply duct 6 and of the protective envelope 9 under the effect of the hot air passing through the supply duct 6.

However, since the hot air passing through said supply duct 6 is under high pressure, this pressure exerts a separating action on the two parts 6.1 and 6.2 of the supply duct 6 and, therefore, on the two parts 9,1 and 9.2 of the protective envelope 9.

As a result, the supply duct 6 acts in the manner of a ram on the partitions 5 and 11, which bulge toward the outside of the compartment 10, as is schematically represented by the broken lines 5d and 11d in FIG. 2. It goes without saying that, in the event of the supply duct 6 rupturing accidentally, the hot air expands into the isolation volume 12, such that the separating action exerted by said hot air on the bulkheads 5 and 11 is increased further still by the larger-diameter ram thus formed by the protective envelope 9. It is therefore necessary to provide reinforcements (for example connecting rods, not shown) applied to said bulkheads 5 and 11 so as to prevent them from bulging not only during operation but also in the event of the supply duct 6 rupturing, this increasing the cost and the mass of the aircraft.

Figure 3A:
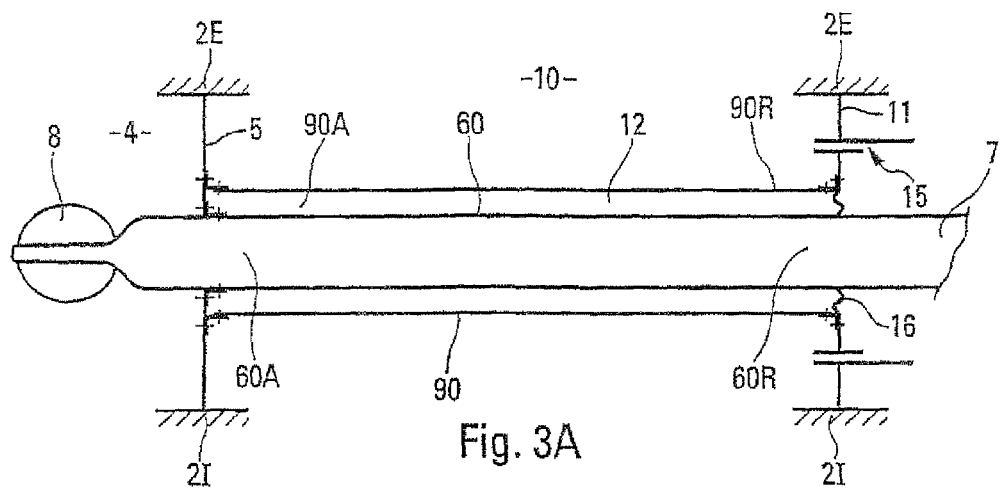
FIGS. 3A, 3B and 3C schematically illustrate, in the manner of FIG. 2, three different positions of the system for deicing the leading edge in accordance with the present invention.
Figure 3B:
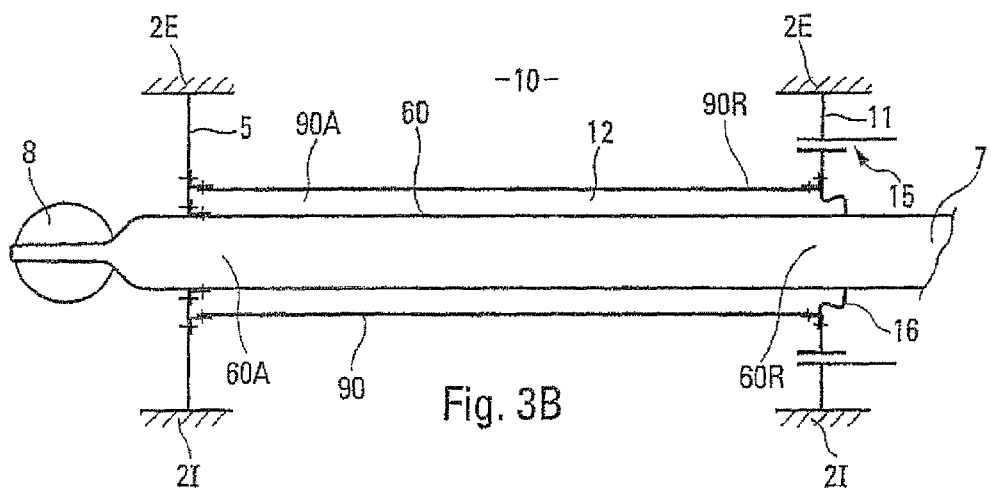
Figure 3C:
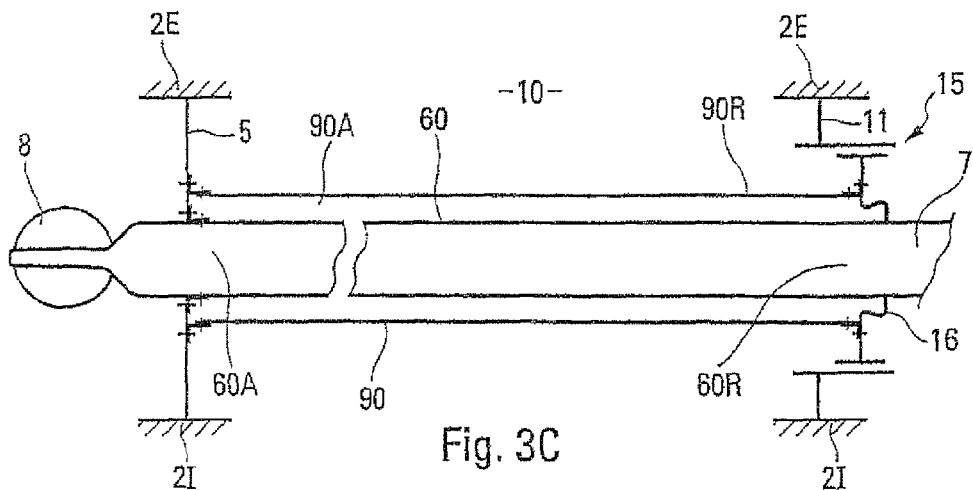

FIGS. 3A, 3B and 3C schematically represent a deicing system according to the invention by means of which these disadvantages can be overcome. By contrast with the known embodiment shown in FIGS. 1 and 2, in the deicing system shown in FIGS. 3A, 3B and 3C:
  the front bulkhead 5 remains unchanged;
  the supply duct 6 (in the form of two parts 6.1 and 6.2 connected in a sealed manner) is replaced by the longitudinally rigid one-piece supply duct 60;
  the protective envelope 9 (in the form of two parts 9.1 and 9.2 connected in a sealed manner) is replaced by the longitudinally rigid one-piece protective envelope 90;
  the rear bulkhead 11 is provided with a sliding bearing 15 relative to which the rear part 90R of the protective envelope 90 can slide; and
  an elastic wall 16 connects the rear part 60R of the supply duct 60 to the rear part 90R of the protective envelope 90, closing off the isolation volume 12 and allowing relative longitudinal movements between said rear parts 60R and 90R.

Furthermore, the front part 60A of the supply duct 60 and the front part 90A of the protective envelope 90 are rigidly fastened to the front bulkhead 5.

FIG. 3A represents, for example, the state of the deicing system according to the invention at rest, without pressurized hot air flowing in the supply duct 60 toward the injector 8. If, starting from the state shown in FIG. 3A, pressurized hot air is admitted into said supply duct 60, said duct has a tendency to elongate under the combined action of the temperature (longitudinal expansion) and of the internal pressure (stretching). In a first instance, the protective envelope 90 remains cold, and therefore of fixed length, such that the elongation of the supply duct 60 is permitted and contained by the longitudinal deformation of the elastic wall 16, as is illustrated by FIG. 3B.

Subsequently, with the temperature of the protective envelope 90 increasing under the effect of the thermal radiation of the supply duct 60, this protective envelope 90 expands longitudinally such that its rear part 90R is displaced with respect to the sliding bearing 15, reducing the longitudinal deformation of the elastic wall 16.

If now, as is represented in FIG. 3C, the supply duct 60 ruptures, the pressurized hot air expands into the protective envelope 90, which is then subjected to the temperature and to the pressure of said hot air. Consequently, the protective envelope 90 thus elongates under the combined action of the temperature and of the pressure, and its rear part 90R is displaced with respect to the bearing 15, the longitudinal expansion of the ruptured supply duct (see FIG. 3C) being contained by said elastic wall 16 connecting said supply duct 60 to said protective envelope 90.

It will therefore be noted from the foregoing that, in each case, the longitudinal expansion of the duct 60 is controlled and contained by the protective envelope 90 and by the elastic wall 16, without forces being applied to the bulkheads 5 and 11 on account of the sliding bearing 15, said elastic wall 16 absorbing the differences in elongation between the supply duct 60 and the protective envelope 90.

Figure 4:
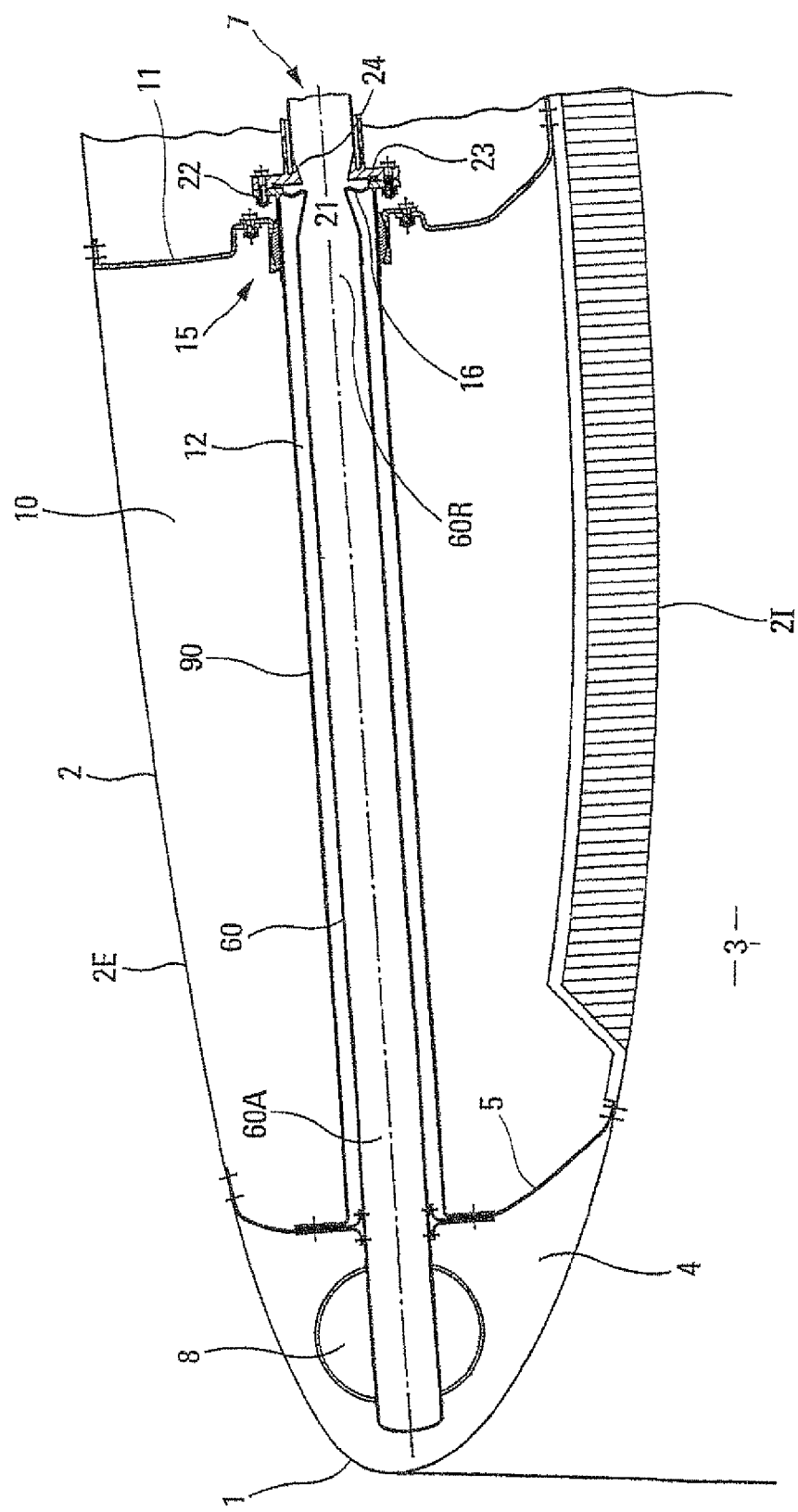
FIG. 4 shows, in a partial schematic view, a practical exemplary embodiment of the deicing system shown in FIGS. 3A, 3B and 3C.
Figure 5:
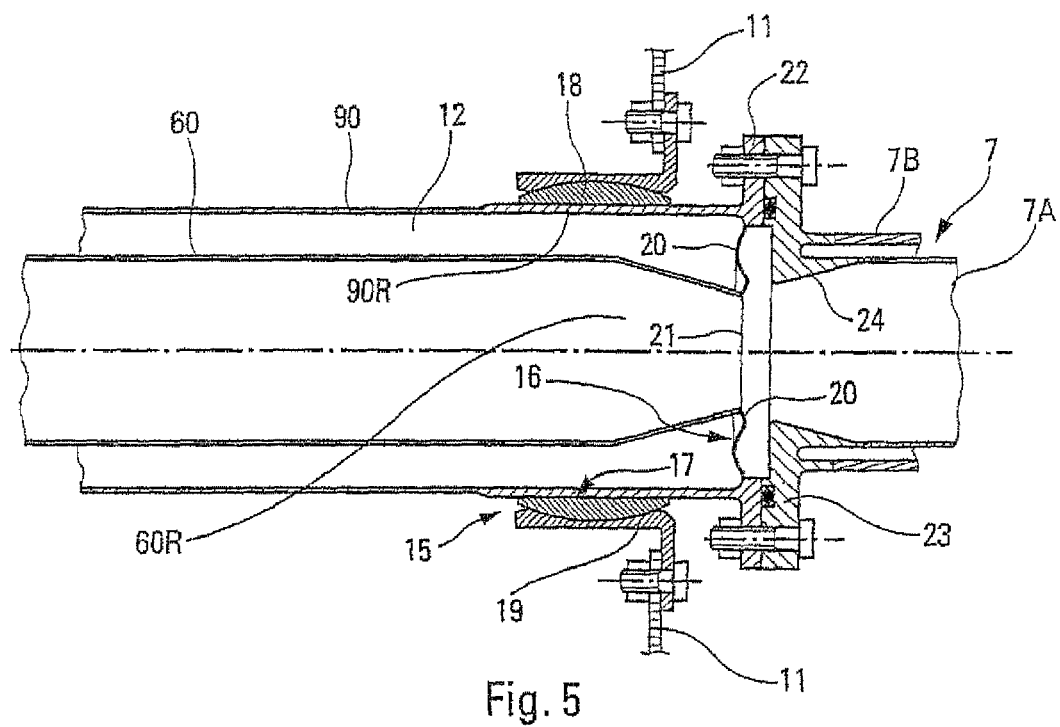
FIG. 5 shows, on an enlarged scale, a detail of FIG. 4.

FIG. 4 shows a practical exemplary embodiment of the deicing system represented schematically in FIGS. 3A, 3B and 3C, FIG. 5 showing, on an enlarged scale, the rear parts 60R and 90R of the supply duct 60 and of the protective envelope 90.

In this exemplary embodiment:

the rear part 90R of the protective envelope 90 is directly slidably mounted in the cylindrical surface 17 of the bearing 15, and the cylindrical surface 17 may be formed in a sphere 18 which additionally allows the protective envelope 90 to perform nutation movements of limited amplitude with respect to the mount 19 of said bearing 15 that bears the sphere 18;

the elastic wall 16 is formed by a spring washer, preferably made of spring steel or the like, arranged in an at least approximately orthogonal manner to the supply duct 60 and to the protective envelope 90, said washer having concentric corrugations 20 and being welded (for example by TIG welding) at its internal and external peripheries to the rear parts 60R and 90R, respectively;

said spring washer is arranged at the location of a narrowing 21 of the rear part 60R of the supply duct 60, allowing a local increase in the cross section of the isolation volume 12 and, therefore, in the width of said spring washer;

the junction between the deicing system and the pressurized hot air circuit 7 (comprising in this example a central duct 7A surrounded by a protective envelope 7B) is produced by means of flanges 22, 23 which are respectively integrally connected to the rear part 90R of the protective envelope 90 and to the circuit 7;

the spring washer forming the wall 16 is arranged level with the flange 22 integrally connected to the rear part 90R of the protective envelope 90; and the flange 23 integrally connected to the circuit 7 comprises a conical guide surface 24 so as to cause the pressurized hot air conveyed thereby to converge toward the narrowing 21 of the supply duct 60 and, in so doing, protect the spring washer 16 from the incident pressurized hot air stream.

Figure 6:
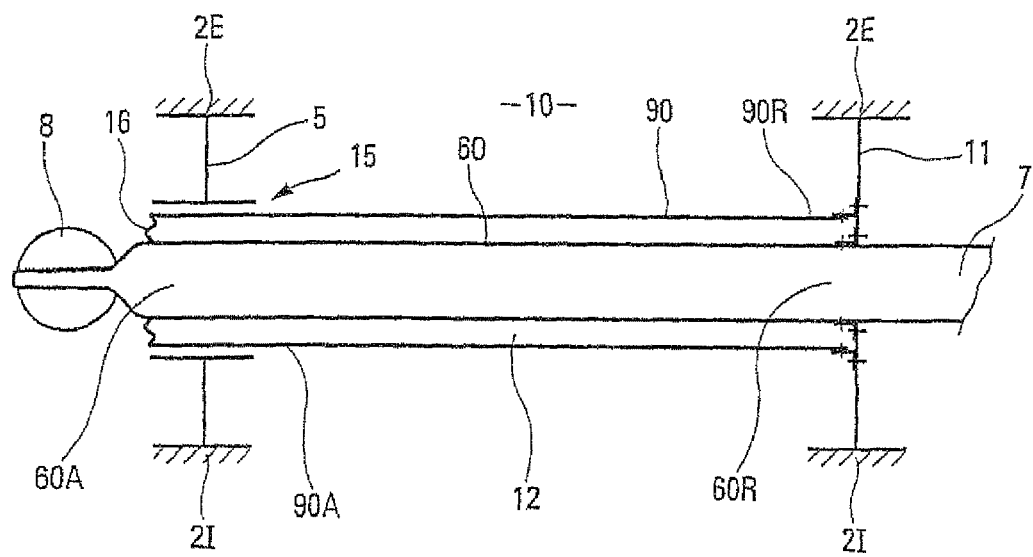
FIG. 6 illustrates a variant embodiment of the deicing system shown in FIGS. 3A, 3B and 3C.

Although, in FIGS. 3A, 3B, 3C and 4, the front bulkhead 5 has been represented as being fixed and the rear bulkhead 11 as being provided with the bearing 15 designed to allow the longitudinal sliding movement of the rear part 90R of the protective envelope 90, it will be readily appreciated from the foregoing and from FIG. 6 that the bearing 15 could be arranged in the front wall 5, the rear wall 11 being fixed. In that case, the front part 90A of the envelope 90 slides in the bearing 15 and the elastic wall 16 connects the front parts 60A and 90A of the supply duct 60 and of the protective envelope 90, whereas the rear parts 60R and 90R of said supply duct and of said protective envelope are rigidly fastened to the rear bulkhead 11.

The invention claimed is:

1. A system for deicing a leading edge of a nose inlet cowl of a turbine engine, said leading edge being defined by a hollow annular chamber closed off by a first internal bulkhead of the cowl, said deicing system comprising:
   a pressurized hot air supply duct having a rear end and a front end in which the rear end of the pressurized air supply duct is connected to a pressurized hot air circuit of the turbine engine and the front end is connected to an injector that injects pressurized hot air from the pressurized hot air circuit into said annular chamber said supply duct passing through a compartment of said nose inlet cowl, with the compartment being defined at a front end by said first internal bulkhead and at a rear end by a second internal bulkhead; and
   an internal protective envelope arranged in said compartment and defining an isolation volume enclosing said supply duct, wherein:
   said supply duct and said protective envelope are longitudinally rigid, and at least one of said supply duct and said protective envelope is integrally connected to the pressurized hot air circuit;
   on one side, said supply duct and said protective envelope are rigidly fastened to one of said bulkheads; and
   on the other side, said protective envelope is configured to slide relative to a sliding bearing provided at the other bulkhead; and
   on said other side said supply duct is connected to said protective envelope by a spring washer made of a spring steel and having internal and external peripheries, with the spring washer being welded to said supply duct and to said protective envelope at the internal and external peripheries of the spring washer, and with the spring washer being configured to close off said isolation volume and provide relative longitudinal movement between said supply duct and said protective envelope.

2. The deicing system as claimed in claim 1, wherein said sliding bearing is arranged in said first internal bulkhead.

3. The deicing system as claimed in claim 1, wherein said sliding bearing is arranged in said second internal bulkhead.

4. The deicing system as claimed in claim 1, wherein said washer has concentric corrugations.

5. The deicing system as claimed in claim 1, wherein said spring washer is arranged at the location of a narrowing of said supply duct.

6. The deicing system as claimed in claim 5, wherein there is provided a conical guide surface upstream of said spring washer, and in connection with the pressurized hot air circuit, so as to cause said pressurized hot air to converge toward said narrowing of said supply duct.

7. The deicing system as claimed in claim 6, wherein:
the rear end of the protective envelope is integrally connected to the hot air circuit by co-acting flanges;
the spring washer and the narrowing are situated level with one of the co-acting flanges, which flange is integrally connected to the rear end of the protective envelope; and
said conical guide surface (24) is formed by the other of the co-acting flanges, which flange is integrally connected to said hot air circuit.

8. The deicing system as claimed in claim 1, wherein said sliding bearing allows said protective envelope to perform a limited nutation movement.

9. The deicing system as claimed in claim 1, wherein the internal protective envelope is integrally connected to the hot air circuit by flanges.

10. The deicing system as claimed in claim 1, wherein the internal protective envelope is integrally connected to the hot air circuit by being rigidly fastened to the second internal bulkhead.

11. The deicing system as claimed in claim 1, wherein the supply duct is rigidly connected to the hot air circuit.

* * * * *